Jan. 30, 1962   R. MONAGHAN   3,019,341
TRACER LOGGING BY NEUTRON ACTIVATION
Filed Nov. 4, 1957   2 Sheets-Sheet 1

INVENTOR.
RALPH MONAGHAN
BY
Robert K. Schumacher
ATTORNEY

Jan. 30, 1962 R. MONAGHAN 3,019,341
TRACER LOGGING BY NEUTRON ACTIVATION
Filed Nov. 4, 1957 2 Sheets-Sheet 2
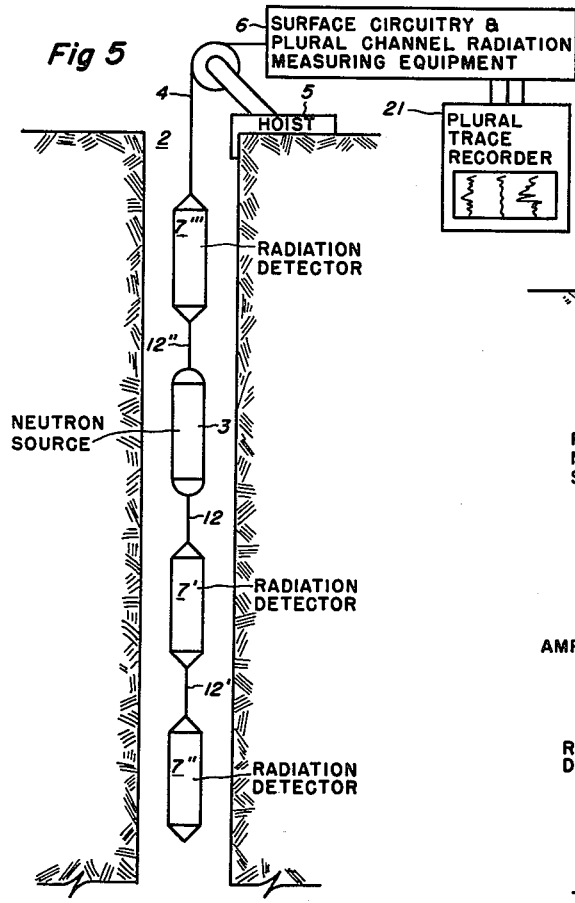
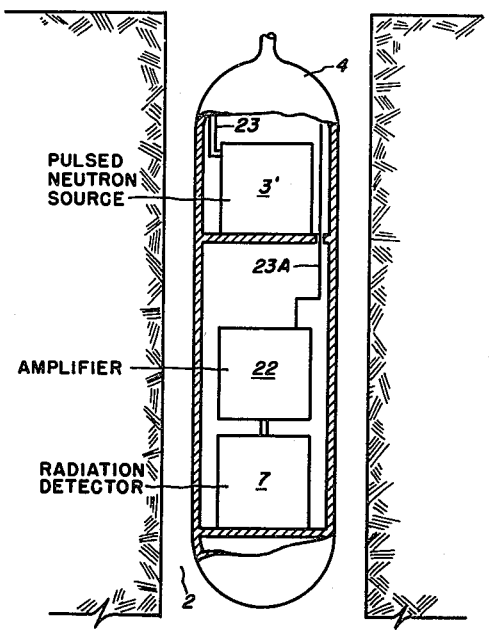
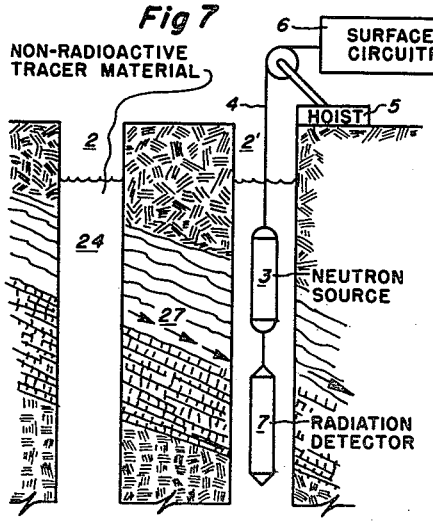
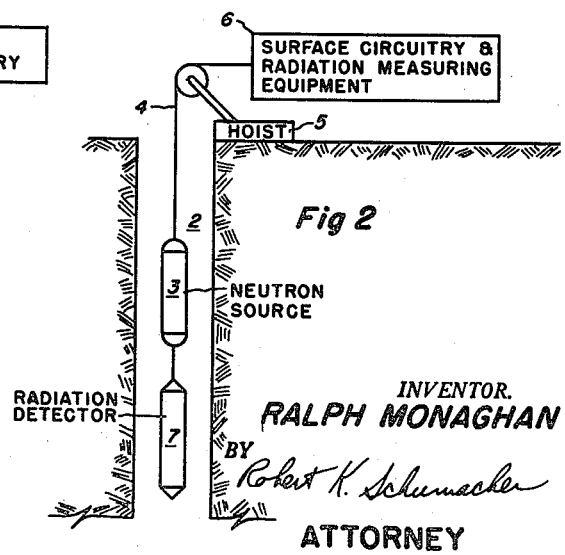
INVENTOR.
RALPH MONAGHAN
BY Robert K. Schumacher
ATTORNEY

United States Patent Office 3,019,341
Patented Jan. 30, 1962

3,019,341
TRACER LOGGING BY NEUTRON ACTIVATION
Ralph Monaghan, Tulsa, Okla., assignor to Well Surveys, Incorporated, a corporation of Delaware
Filed Nov. 4, 1957, Ser. No. 694,429
10 Claims. (Cl. 250—106)

This invention relates to radioactivity well logging and more particularly to a novel method and apparatus for use in conjunction therewith.

In modern-day subsurface exploration, tracer logging is practiced by injecting a radioactive material into a borehole, and then determining the distribution of the tracer material by means of a radiation detector. By this method it is possible to ascertain the distribution of the radioactive tracer material either in the same borehole, or in adjacent boreholes. This distribution may, of course, be measured either immediately following the injection or after a suitable time delay. The data secured thereby makes it possible to fix the location of the porous subsurface strata, or to measure the flow through said strata. Such conventional methods of tracer logging also lend themselves to indicating the presence of subterranean oil deposits, by determining the affinity of the strata for certain materials.

In the past, the various processes of tracer logging have been hampered by the difficulty of selecting a radioactive material which is applicable to field conditions, and is also characterized by a half life of proper duration. Ideally, such a radioisotope has a half life which is long enough to permit distribution studies over several days and yet short enough not to contaminate the well permanently with radioactivity. Such short half lives are also required in order to eliminate any danger of contaminated subterranean water issuing at the surface at a later date. On the other hand, the material used for such conventional tracer logging methods must have a half life which is long enough to make shipping from the isotope supplier to the well site practical. The difficulties involved in balancing the conflicting requirements with regard to the half life of the isotope are obvious from the foregoing discussion.

According to the present invention it is proposed to conduct tracer logging operations with substances which are not initially radioisotopes, but which become so when irradiated with neutrons. The materials contemplated by this invention yield radioactive isotopes as a result of exposure to either slow or fast neutrons. These materials may include substances which emit gamma rays, alpha particles, protons or neutrons in response to neutron bombardment leaving the product nucleus radioactive. Such reactions, for purposes of this specification may be characterized as $(n-\gamma)$, $(n-\alpha)$, $(n-\text{proton})$ and $(n-2n)$ reactions, respectively. The above mentioned double neutron reactions may be secured by using incident neutrons of high energy, as from the deuterium-tritium reaction disclosed in U.S. Patent No. 2,712,081 to Fearon and Thayer. Some gamma, proton and alpha reactions may be readily obtained by means of bombardment with conventional irradiating means such as radium-beryllium sources.

After activation by neutron bombardment, the resulting radioactive tracer can then be detected and identified by the measurement of emitted radiation, as well as by measurement of the decay time. As used in this specification, the word "tracer" will be understood to include those substances which can be made radioactive by neutron bombardment.

The method and apparatus of the present invention are not limited to tracer logging operations within a single well. The applicability of the invention in studying the interaction between a plurality of wells will be appreciated as the detailed description proceeds. For instance, the tracer may either be activated and measured in a borehole adjacent to the one into which it was injected, or activated in one borehole and measured in another borehole.

The preferential activation of the tracer with respect to other substances in the borehole will exist because of the varying activation cross sections, and will also reflect the duration of the activation time. The activation, I, produced in the material is given by the well-known exponential relation:

$$I = I_0(1 - e^{-\lambda t})$$

In this equation, the significance and dimensions of the terms are as follows:

$I$ = activation (disintegrations/second)
$I_0$ = saturation activation (disintegrations/second)
$\lambda$ = disintegration constant (seconds$^{-1}$)

The saturation activation coefficient $I_0$ is given by the product of the following variables:

$$I_0 = n\sigma_{\text{act}} N$$

In this product, the variables are defined as follows:

$n$ = neutron flux density (neutrons/cm.$^2$/second)
$N$ = total number of nuclei present having an activation cross section $\sigma_{\text{act}}$.

It will be observed that any given fraction of the saturation activation (say 90%) may be reached in different times, depending on the value of the exponential decay constant $\lambda$ which characterizes the particular radioactive isotope. The choice of the particular material to be activated is governed by the interfering activities of the substances which occur in the strata to be analyzed. The selected tracer material will generally comprise a substance which is relatively scarce in the strata to be logged.

Among the elements which are suitable for use as a tracer material are those leading to the following isotopes after activation by neutron bombardment:

| | |
|---|---|
| $Dy^{165}$ | $Ir^{194}$ |
| $Eu^{152}$ | $Ho^{166}$ |
| $Ir^{192}$ | $Mn^{56}$ |
| $Co^{60}$ | $La^{140}$ |
| $Au^{198}$ | $As^{76}$ |
| $Ag^{110}$ | $V^{52}$ |

Of course these elements need not be pure, but may be present in any convenient compound or mixture so long as there is enough of the desired material for identification.

In practicing the invention, it is contemplated that a variety of methods and apparatus may be used for the actual activation, detection and measurement. Once the injection of the non-radioactive tracer material has been effected, many of the systems which are used in conventional radioactivity well logging, will be found suitable for irradiating the well bore, and detecting the resulting radioactivity.

For instance, the neutron source may be inserted in the borehole after injection in order to allow irradiation of the strata at a given point. Following this, the neutron source is removed from proximity to the given point, either by movement to some other point in the borehole, or by complete removal therefrom. A suitable radiation detector is then moved to the point previously occupied by the source and the radiations from the strata are measured.

If desired, the neutron bombardment and subsequent detection may comprise a continuous measurement made possible by employing a spaced radiation source and detector on the same cable.

By employing such a spaced detector and source, it is possible to preferentially activate and detect the several elements, the $i$th element of which is characterized by a half life of (say) $T_1$ seconds. The amount of activation for a given neutron flux may be controlled by accurately controlling the duration of the activation period. For instance, to achieve K percent saturation, we have:

$$K = (1 - e^{-.693 t/T_i}) \times 100 \text{ percent activation}$$

Since $$I = n\sigma_{act,i} N_i (1 - e^{-.693 t/T_i}) \frac{\text{disintegrations}}{\text{second}}$$

For a source field of finite dimensions the length of time "$t$" in a continuous logging operation would be determined by the speed with which the source is pulled past the strata.

An alternative method of practicing the invention renders it possible to distinguish between the various elements which are activated in the strata by taking readings at some time $t'$ after the source has been in proximity with the stratum to be analyzed. In this case the activation will have decayed to a new value:

$$I'_i = n\sigma_{act,i} N_i (1 - e^{-.693 t/T_i}) e^{-.693 t'/T_1}$$

disintegrations/second

The exponent $t'$ may be readily controlled either by adjusting the logging speed, or by adjusting the distance between the source and the detector. The value of $t'$ will be given by the quotient L/V where L is the distance between the source and the detector, and V is the logging velocity. In general short-lived substances, which are characterized by a small $T_i$, will require shorter activation times and will have to be measured sooner after activation has ceased.

In practicing this aspect of the invention, there may be provided a source linked to a plurality of spaced detectors suspended therebeneath. Each detector responds to a different group of elements. More particularly, the detectors which are closest to the neutron source measure both long- and short-lived elements. The relatively remote detectors respond only to the longer lived elements. Measurement of the natural gamma rays emanating from the strata prior to activation may be accomplished by having a detector located above the neutron source. By means of suitable circuitry, the latter detector allows for the subtraction of the naturally occurring gamma rays from those due to the activated elements.

In another aspect of the invention, means are provided for altering the distance between the source and the detector by motor means remotely actuated from the surface equipment. In still another aspect of the invention means are provided for changing the linear distance between source and detector by displacing extensible housing sections in the downhole instrument.

In another embodiment of the present invention the preferential activation is accomplished by a neutron source which can be turned on or off, such as the pulsed deuterium and tritium neutron source disclosed in United States Patent 2,689,918, issued to Arthur Youmans on September 21, 1954. Such a neutron source makes it possible to both activate and measure with the source and detector at the same location in the borehole. With such pulsed sources, any desired percentage activation can be readily produced by controlling the duration of the interval during which neutrons are emitted. Measurement of the intensity of the emitted radiations may then be made immediately after the source is turned off or after a predetermined time interval.

Accordingly, therefore, a primary object of this invention is to provide an ingenious method and apparatus for performing tracer logging by using neutron activated materials in a borehole.

Another method of this invention is to teach a method of tracer logging which employs materials which do not occasion any health hazards to personnel engaged in well logging operations.

Another object of this invention is to teach a method of well logging in which the tracer material yields a radioactive isotope only after irradiation with a neutron flux.

Another object of this invention is to teach novel methods and apparatus for deriving data on subsurface formations by bombarding an originally non-radioactive material and measuring the radiation emanating therefrom after bombardment has ceased.

Still another object of this invention is to disclose a logging system wherein the tracer material comprises a substance which becomes radioactive by neutron bombardment and renders possible a time delayed measurement indicative of activation unobscured by gamma rays emitted during bombardment.

A further object of the invention is to teach various methods for accomplishing a delayed measurement of activated tracer material following cessation of the activating flux.

A further object of this invention is to disclose a means for ascertaining the relative depth of porous strata, the flow rate of fluid through said layers of strata, and the affinity of said strata for materials which indicate the presence of oil, by measuring the radiation emanating from neutron irradiated tracer material.

A still further object of the invention is to disclose a method of logging using a pulsed neutron source in which the neutron flux may be discontinued by means of a signal remotely dispatched from the earth's surface.

Other and further objects of this invention will become evident by reference to the following description and drawings in which like numerals indicate like parts and in which:

FIGURES 1A and 1B, respectively, illustrate a method of practicing the invention in which separate elements of apparatus are employed in distinct operations to accomplish the logging of a single borehole.

FIGURE 2 shows a method of practicing the invention in which a single apparatus employing a neutron source in spaced relation with a detector is used to accomplish the logging of a borehole.

FIGURE 5 shows a system which includes a plurality of radiation detectors in vertically spaced relation to the neutron detector, along with a detector positioned thereabove to detect naturally occurring gamma radiation.

FIGURE 6 shows diagrammatically the structure of a downhole instrument adaptable for providing interruptible intervals of neutron bombardment as well as detection of the radioactivity induced thereby.

FIGURE 7 shows a method of practicing the invention in conjunction with adjacent boreholes, by injecting the non-radioactive tracer material in one borehole, and detecting it after activation in a second borehole.

Figure 1A:
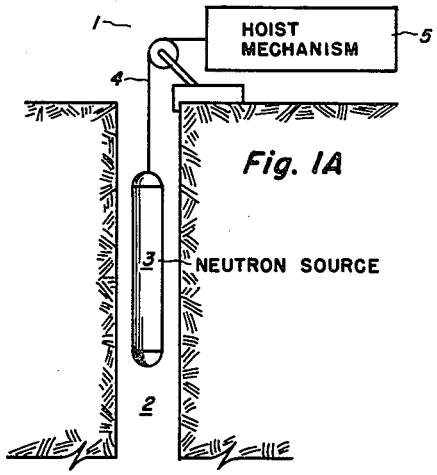

Turning now to the drawings and more particularly to FIGURE 1A thereof, the numeral 1 indicates generally an apparatus for accomplishing the activation of a borehole. It will be appreciated that the borehole 2 shown in FIGURE 1A has been injected with one of the non-radioactive tracer materials mentioned earlier in this specification in any manner well known in the art. After introduction of the tracer material into the borehole, the neutron source 3 is caused to traverse the length of the borehole. The neutron flux provided by source 3 activates the tracer material and causes it to become radioactive. The neutron source 3, as seen in the drawing, is suspended at the end of a cable 4 which is actuated by means of a conventional hoist mechanism 5. Cable 4 is characterized by ample mechanical strength, and is provided with suitable electrical conductors therewithin.

Figure 1B:
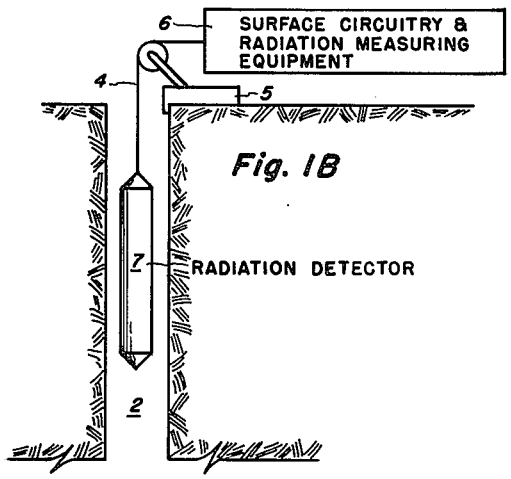

In FIGURE 1B, the detection of the activated tracer material is accomplished by separate apparatus in a second operation. In this operation, a radiation detector 7 is caused to traverse the formations by means of the cable 4. Detector 7 may comprise a conventional type of unit such as a Geiger counter, an ionization chamber, or a scintillation crystal used in conjunction with a photomultiplier. Electrical signals generated by the radiation detector in response to incident radiation are conveyed uphole, via the conductors in cable 4, to the surface circuitry and radiation measuring equipment 6. The unit 6 may include a suitable recorder mechanism. As earlier explained in this specification, the duration of time between the activation and the detection may be controlled in order to make possible selective identification of the strata.

In FIGURE 2, the use of a spaced detector and source is illustrated. Activation of the injected tracer material is accomplished by the neutron source 3. At a fixed interval thereafter, the radiation detector 7 is brought into proximity with the previously irradiated sections of the strata. The duration of the interval is controlled either by regulating the logging speed, or by adjusting the distance between the detector and source.

Figure 3:
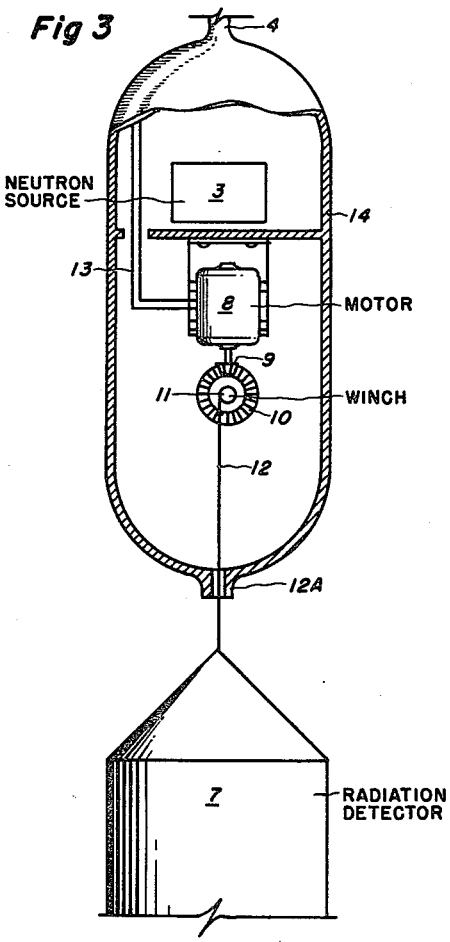
FIGURE 3 illustrates diagrammatically the form of a downhole logging instrument in which the spacing between the radiation detector and the neutron source is readily controllable by means of an electrical signal from the surface.

Continuing now with the detailed description, the embodiment shown in FIGURE 3 comprises a downhole logging instrument with remotely operable means for varying the spacing between the radiation detector and the neutron source. In FIGURE 3, the reference numeral 8 is used to identify a reversible winch motor. Motor 8 may comprise any conventional readily reversible electric motor. The spindle of the motor terminates in a bevel gear 9. The gear 9 engages and meshes with a circular ring gear 10. A winch 11 is affixed to the ring gear 10 and rotates concentrically therewith. A plurality of convolutions of cable 12 are wound upon and supported by the winch 11, as seen in the drawing. The cable 12 passes through a pressure-tight seal 12A located in the lower portion of the instrument casing, and supports a radiation detector 7 suspended therebeneath.

Figure 4:
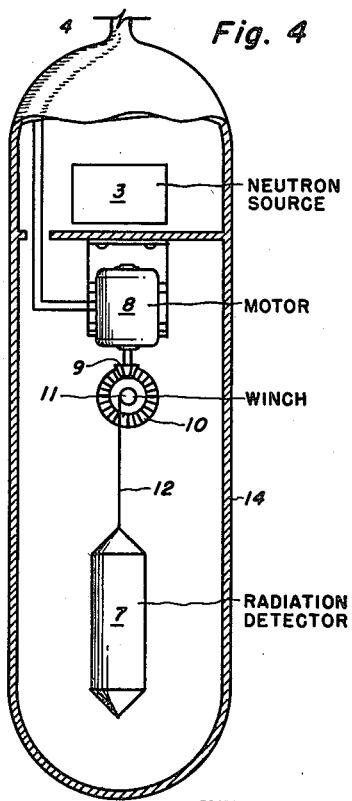
FIGURE 4 illustrates diagrammatically another form of downhole logging instrument in which the spacing between the detector and the neutron source is controllable from the surface by an electrical signal.

A pair of electrical conductors 13 are provided in order to supply power to the motor 8. The conductors 13 extend upwardly, via cable 4, to the surface equipment. By energizing motor 8 with electrical energy of the proper polarity the bevel gear 9 and associated ring gear 10 may be caused to rotate in either direction and cause the winch 11 to either reel up or unreel the cable 12. The linear spacing between radiation detector 7 and neutron source 3 may thus be varied by means of a surface actuated switch means. It will be obvious that the time interval which occurs between detection and radiation may be readily controlled by adjusting the spacing between the neutron source and the detector.

Where the detector need not be spaced a great distance from the neutron source, the detector may be moved relative to the source entirely within the housing 14, as illustrated in FIGURE 4. The motion may be imparted as illustrated or by other means such as gears or threads. The downhole instrument shown in both FIGURES 3 and 4 will be understood to include such conventional stages of electronic amplifiers, impedance matching circuitry and the like, as are usually employed in the type of instrument used in conducting radioactivity well logging to develop a signal indicative of radiation and apply it to the cable for transmission.

An alternative embodiment of the invention is shown in FIGURE 5. In this drawing, the use of a plurality of spaced radiation detectors is illustrated. It will be appreciated, of course, that the borehole 2 shown in FIGURE 5 has been injected with a suitable quantity of one of the non-radioactive tracer materials mentioned earlier in this specification. The disclosed structure includes a neutron source 3 with radiation detectors 7' and 7" suspended therebeneath by means of cables 12 and 12', respectively. Suitable electrical conducting means are provided within cables 12 and 12' for conveying to the surface the signals generated within detectors 7' and 7". The neutron flux emitted by source 3 activates the tracer material adjacent the well bore. The radioactivity thus induced impinges upon the spaced detectors 7' and 7" as they traverse the formations.

Above the neutron source 3 there is provided a radiation detector 7''' for sampling the naturally occurring gamma radiation of the formations prior to the activation of the tracer material by the neutron source 3. As earlier explained, the level of naturally occurring gamma radiation may be subtracted from the post neutron activation radiation signal by means of suitable circuitry to produce a signal independent of the natural gamma ray level. In making this correction, it is obviously necessary to operate on signals occasioned by the same formations so that it is necessary to introduce some time delay in the signal from one detector until the signal is produced from another detector opposite the same formation. Subtracting the output of detector 7" from the output of detector 7' will likewise eliminate the effect of natural gamma rays although at times this loses useful information.

A plurality of detectors for detecting radioactivation are useful in separating tracer radioactivation from radioactivation of elements normally found in the formations about the well. Since each radioisotope has a peculiar half-life, activity after a time interval depends both upon the amount and kind of radioisotope present. The ratio of measurements made at different intervals following irradition provides an indication of the rate of decay of the radioisotopes present and thus distinguishes the tracer radioactivity from the radioactivity of the normal borehole material. A simpler method of correlation is merely to record the two signals together.

The electrical signals generated with the plural radiation detectors are conveyed to the surface circuitry and radiation measuring equipment 6, by way of the conductors in cables 4, 12, 12' and 12". A recorder 21 is mounted to receive input signals from the surface circuitry 6. The recorder 21 may comprise a conventional plural trace recorder, connected to provide a permanent record of the variations of several variables with depth. In this case, the three variables which are to be recorded comprise the electrical output of the spaced radiation detectors 7', 7" and 7''' shown within the well bore. It will be appreciated, of course, that more than two radiation detectors may be suspended beneath the neutron source in practicing this aspect of the invention. Further, the source and several detectors may be mounted in a single larger housing.

There is another method for distinguishing the radioactivated tracer material from the material normally in and around the borehole which is also necessarily radioactivated at the same time. For the performance of this method, the tracer material must differ substantially from elements commonly found in the formations about the well. A proportional gamma ray detector, such as a scintillation counter, is used in conjunction with a well-known pulse-height analyzer to provide measurements of gamma rays of particular energies. By using a tracer which, upon radioactivation, produces characteristic gamma rays differing in energy from natural gamma rays and gamma rays produced by radioactivation of the formation material, the relative presence of the tracer can be identified without its being obscured by these other radiations.

The use of an intermittently actuated neutron source in practicing the invention is illustrated in FIGURE 6. The form of downhole instrument disclosed in this figure includes a pulsed neutron source 3'. The intervals during which neutron flux is allowed to emanate from source 3' may be controlled by an electrical signal transmitted from the surface borne equipment via electrical conductors 23 in cable 4. Alternatively, an automatic timer may be utilized with a power supply within the instrument to control the intervals. A radiation detector 7 is provided in order to sense the radioactivity emanating from the activated tracer material. Electrical signals generated by detector 7 are coupled to amplifier 22 for transmission to the surface via conductors 23A. If desired, the structure disclosed in United States Patent 2,689,918, issued to Arthur Youmans on September 21, 1954, may be employed in practicing this aspect of the invention.

The use of a pulsed source makes it possible to measure the rate of decay of radioactive material with a single detector. The same detector may be used to make two or more delayed measurements which may be correlated to provide an indication of rate of decay to identify the relative presence of the tracer material. This implies discontinuous measurements. It is also within the scope of this invention to make a series of point or stationary measurements wtih a conventional source by irradiating a particular zone for an interval of time, physically removing the source from the zone and replacing it with a detector, and thereafter measuring radioactivity.

Still another aspect of the present invention is illustrated in connection with FIGURE 7. This portion of the drawings illustrates the method of practicing the invention in conjunction with a plurality of adjacent boreholes. The tracer logging shown in this figure is accomplished by injecting the non-radioactive tracer material into one borehall and detecting it after it is activated within a second borehole. The numeral 24 indicates a supply of the non-radioactive tracer material which has been injected into the borehole 2. The tracer material, as indicated by the arrows, has penetrated the porous strata 27 and come into proximity with a portion of the borehole 2'. The tracer material is activated by neutron flux emanating from the source 3 located within the borehole 2'. Cable 4 is provided for vertically displacing neutron source 3 in order to accomplish this activation of the material. The radiation detector 7 is mounted in spaced relation to the source 3. The point of fluid entry can be identified as the instrument traverses the borehole. The electrical signals generated within detector 7 are conveyed uphole, via the conductors in cable 4, to the surface circuitry 6. The linear position of the apparatus within the borehole is controlled by the hoist mechanism 5.

An alternative method of practicing the invention is in conjunction with a plurality of boreholes. In this method, the non-radioactive tracer material 24 is first injected into the borehole 2. Activation is then accomplished within the same borehole where the tracer material was injected. The migration of the activated tracer material through porous strata such as that indicated by the numeral 27 is ascertained by traversing suitable radiation detection means within an adjacent borehole, such as the one indicated by the numeral 2' in FIGURE 7.

While, therefore, I have disclosed my invention in full, clear and concise terms, as required by the statute, it will be obvious that many substitutions, alterations, and modifications may be made therein, wtihout departing from the spirit and scope of the appended claims.

I claim:

1. The method of ascertaining the character of subsurface strata penetrated by a well bore which includes introducing into the well fluid in said well bore a normally non-radioactive tracer material which becomes radioactivated when exposed to neutrons, radioactivating said tracer material within said well bore fluid by irradiating said well bore fluid with neutrons, a determined time interval after irradiation detecting the presence of said radioactivated material by its radioactivity, and transmitting the signal produced by said detection to the surface.

2. The method of ascertaining the character of subsurface strata pierced by a well bore which includes injecting into the well fluid in said well bore nonradioactive tracer material which becomes radioactivated when exposed to neutrons, irradiating said well bore fluid with a source of neutrons for a period of time to render said material radioactive, and a determined time interval after cessation of irradiation detecting radiations reaching a detector in said well bore as a measure of the relative presence of said irradiated tracer material.

3. The method of ascertaining the character of subsurface strata pierced by a well bore which includes injecting into the well fluid in said well bore nonradioactive tracer material which becomes radioactivated when exposed to neutrons, irradiating said well bore fluid with a source of neutrons for a perod of time to render said material radioactive, and a determined time interval after cessation of irradiation detecting gamma radiations reaching a detector in said well bore and of selected energy characteristic of said radioactivated material as a measure of the relative presence of said irradiated tracer material.

4. The method of ascertaining the character of subsurface strata pierced by a well bore which includes injecting into the well fluid in said well bore nonradioactive tracer material which becomes radioactivated when exposed to neutrons, detecting natural radiations reaching a zone in said well bore by producing a first electrical signal systematically related thereto, irradiating said well bore fluid with a source of neutrons for a period of time to render said material radioactive, a determined time interval after cessation of irradiation detecting radiations reaching said zone in said well bore by producing a second electrical signal systematically related thereto, differentially combining said first and second electrical signal to derive a third electrical signal indicative of the relative presence of said irradiated tracer material.

5. The method of ascertaining the character of subsurface strata pierced by a well bore which includes injecting into the well fluid in said well bore nonradioactive tracer material which becomes radioactivated when exposed to neutrons, irradiating said well bore fluid with a source of neutrons for a period of time to render said material radioactive, at a plurality of determined time intervals after cessation of irradiation detecting radiations reaching a zone in said well bore and correlating said detection at said plurality of time intervals as a measure of the relative presence of said irradiated tracer material.

6. The method of ascertaining the character of subsurface strata pierced by a well bore which includes injecting into the well fluid in said well bore non-radioactive tracer material which becomes radioactivated when exposed to neutrons, irradiating said well bore fluid with a source of neutrons for a period of time to render said material radioactive, and after cessation of irradiation measuring the rate of decay in the intensity of radiations reaching a detector in said well bore as a measure of the relative presence of said irradiated tracer material.

7. The method of ascertaining the character of subsurface strata adjacent a well bore which includes injecting into the well fluid in said well bore a normally non-radioactive material which becomes radioactivated when exposed to neutrons, traversing a neutron source within said well bore to radioactivate said material, thereafter effecting a first and a second time delayed detection of radioactiviy, and correlating said first and second detections to provide an indication of the relative presence of said material.

8. The method of ascertaining the character of subsurface strata pierced by a well bore which includes injecting into the well filuid in said said bore a normally non-radioactive material which becomes radioactivated when exposed to neutrons, traversing a source of neutrons within said bore at a rate to radioactivate said material preferentially with respect to other nearby material, and traversing a radiation detector in said bore a predetermined time thereafter to generate electrical signals when exposed to said radioactivated material.

9. The method of ascertaining the character of subsurface strata pierced by a well bore which includes injecting into the well fluid in said said well bore a normally non-radioactive tracer material which becomes radioactivated when exposed to neutrons, positioning a downhole instrument which includes a pulsed neutron source within said well bore to irradiate said tracer material for predetermined time intervals that produce activation of said material in preference to the activation of other nearby material, and detecting said irradiated tracer material a predetermined time interval after a pulse by means of a detector positioned within said instrument.

10. The method of ascertaining the character of the subsurface strata lying between a plurality of well bores which includes injecting into the well fluid in at least one of said well bores a normally non-radioactive material which is radioactivated when exposed to neutrons, traversing a source of neutrons within another of said well bores to irradiate any portions of said material which have penetrated the strata therebetween, and detecting radiations in said other borehole after a predetermined time interval has elapsed since said traversing of said neutron source.

References Cited in the file of this patent
UNITED STATES PATENTS

| | | |
|---|---|---|
| 2,398,324 | Pontecorvo | Apr. 9, 1946 |
| 2,437,935 | Brunner et al. | Mar. 16, 1948 |
| 2,443,680 | Herzog | June 22, 1948 |
| 2,453,456 | Piety | Nov. 9, 1948 |
| 2,480,674 | Russell | Aug. 30, 1949 |
| 2,484,422 | Muskat | Oct. 11, 1949 |
| 2,583,288 | Arps | Jan. 22, 1952 |
| 2,599,975 | Carpenter | June 10, 1952 |
| 2,640,936 | Pajes | June 2, 1953 |
| 2,810,076 | Mardock | Oct. 15, 1957 |
| 2,813,980 | De Witte | Nov. 19, 1957 |
| 2,841,713 | Howard | July 1, 1958 |
| 2,867,728 | Pollock | Jan. 6, 1959 |

FOREIGN PATENTS

| | | |
|---|---|---|
| 724,441 | Great Britain | Feb. 23, 1955 |

UNITED STATES PATENT OFFICE
CERTIFICATE OF CORRECTION

Patent No. 3,019,341                           January 30, 1962

Ralph Monaghan

It is hereby certified that error appears in the above numbered patent requiring correction and that the said Letters Patent should read as corrected below.

Column 8, line 73, for "filuid in said said bore" read -- fluid in said bore --; column 9, line 8, strike out "said", first occurrence.

Signed and sealed this 19th day of June 1962.

(SEAL)
Attest:

ERNEST W. SWIDER
Attesting Officer

DAVID L. LADD
Commissioner of Patents